(12) United States Patent
Kreutz

(10) Patent No.: US 7,396,998 B2
(45) Date of Patent: Jul. 8, 2008

(54) SLEEVE FOR CABLE ENTRIES, PIPE PENETRATIONS

(75) Inventor: Tomas Kreutz, Lyckeby (SE)

(73) Assignee: Roxtec International AB, Karlskrona (SE)

( * ) Notice: Subject to any disclaimer, the term of this patent is extended or adjusted under 35 U.S.C. 154(b) by 268 days.

(21) Appl. No.: 10/544,329

(22) PCT Filed: Jan. 14, 2004

(86) PCT No.: PCT/SE2004/000024

§ 371 (c)(1), (2), (4) Date: Aug. 3, 2005

(87) PCT Pub. No.: WO2004/070250

PCT Pub. Date: Aug. 19, 2004

(65) Prior Publication Data

US 2006/0260836 A1 Nov. 23, 2006

(30) Foreign Application Priority Data

Feb. 5, 2003 (SE) ..................................... 0300292

(51) Int. Cl.
*H02G 15/02* (2006.01)
(52) U.S. Cl. ........................................ 174/93; 174/651

(58) Field of Classification Search .................. 174/93, 174/651, 652
See application file for complete search history.

(56) References Cited

U.S. PATENT DOCUMENTS 2,024,862 A * 12/1935 Hooley ........................ 174/100

FOREIGN PATENT DOCUMENTS

DE 1925658 10/1965
DE 29906645 9/2000

* cited by examiner

*Primary Examiner*—Chau N Nguyen

(57) ABSTRACT

The present invention concerns a sleeve (1) for cable entries, pipe penetrations etc. The sleeve (1) has a central part (3) with a through central opening and one flange (2) at one end of the central part (3). The flange (2) is directed radially away from the central part (3). A compressible part (4) is arranged the flange (2) and a compression means (5), here in the form of a ring. The ring is arranged slidable on the outside of the central part (3). By means of screws (6) the compression means (5) may be forced towards the flange (2) of the central part (3), compressing the compressible part (4). By means of the compression of the compressible part (4) the sleeve (1) is fixed to a plate (7) or the like.

10 Claims, 2 Drawing Sheets

SLEEVE FOR CABLE ENTRIES, PIPE PENETRATIONS

TECHNICAL FIELD

The present invention concerns a sleeve, to be used with cable entries, pipe penetrations or the like. It also concerns means to mount the sleeve to a plate or the like.

PRIOR ART

Different sleeves of this kind are widely used today. The sleeves are parts of systems used to seal at cable entries, pipe penetrations etc. In addition to the sleeve the systems normally comprises further elements, such as seals, frames etc. to be placed tightly surrounding cables, pipes etc. Systems of this kind are used in many different environments, such as for cabinets, technical shelters, junction boxes and machines and also decks and bulkheads of ships. They are used in different industrial environments, such as automotive, telecom, power generation and distribution, as well as marine and offshore.

The seals may have to seal against fluid, gas, fire, rodents, termites, dust, moisture etc. The seal may receive cables for electricity, communication, computers etc. or pipes for different gases or liquids such as water, compressed air, hydraulic fluid and cooking gas.

It is of course vital that the sleeve receiving the seals for the cable entries, pipe penetrations etc., is sufficiently sealed when mounted.

Sleeves of this kind have normally been attached to a plate being a part of a cabinet, technical shelter, junction box, machine, deck, bulkhead etc. The sleeve has been attached by means of screw joints, rivets, welding etc. to the plate. Thus, one has often been forced to work from both sides of the sleeve in mounting of the sleeve. Furthermore, welding may be difficult and cumbersome for retrofit. Especially if only a limited number of sleeves are to be retrofitted.

SUMMARY OF THE INVENTION

One object of the present invention is to have a sleeve for pipe penetrations, cable entries etc. that is relatively easy to mount to a plate or the like. Yet the sleeve should be mounted in a secure, stable and sealed way.

A further object is that the sleeve should be possible to retrofit in a simple way and preferably from one side.

Still a further object is to have a sleeve with relatively simple fixation and sealing means. It should be simple in that way that it uses a limited number of parts and is easy to produce and mount. Furthermore, the area around the opening of the plate is not affected, i.e. no holes are drilled, no welding or soldering is performed etc.

According to the invention a sleeve for cable entries, pipe penetrations etc. is provided. The sleeve has a central part, with a through central opening and a flange at one end of the central part. The flange is directed away from the central part. A compressible part is arranged between the flange and a compression means, arranged slidable on the outside of the central part. The central part is to be received in an opening of a plate or the like. The diameter of the opening of the plate is smaller than the outer diameter of the flange, whereby the flange will abut against one side of the plate. Furthermore, the axial extension of the compressible part is larger than the axial extension of the opening of the plate.

The sleeve according to the present invention may be mounted from one side of a plate or the like, making the sleeve fairly simple to mount. Thus, the sleeve is suitable for retrofit.

Further objects and advantages of the present invention will be obvious for a person skilled in the art when reading the detailed description below of at present preferred embodiments.

BRIEF DESCRIPTION OF THE DRAWINGS

The present invention will be described further below by way of an example and with reference to the enclosed drawings. In the drawings.

DETAILED DESCRIPTION OF PREFERRED EMBODIMENTS

Figure 1:
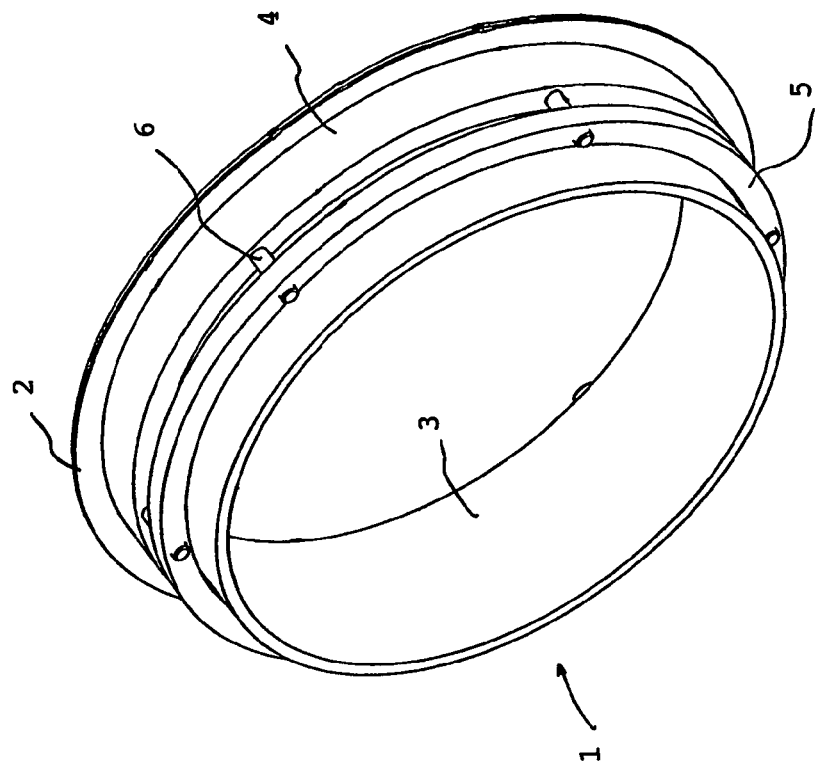
FIGS. 1 and 2 are perspective views of a sleeve according to the present invention taken from opposite sides.
Figure 2:
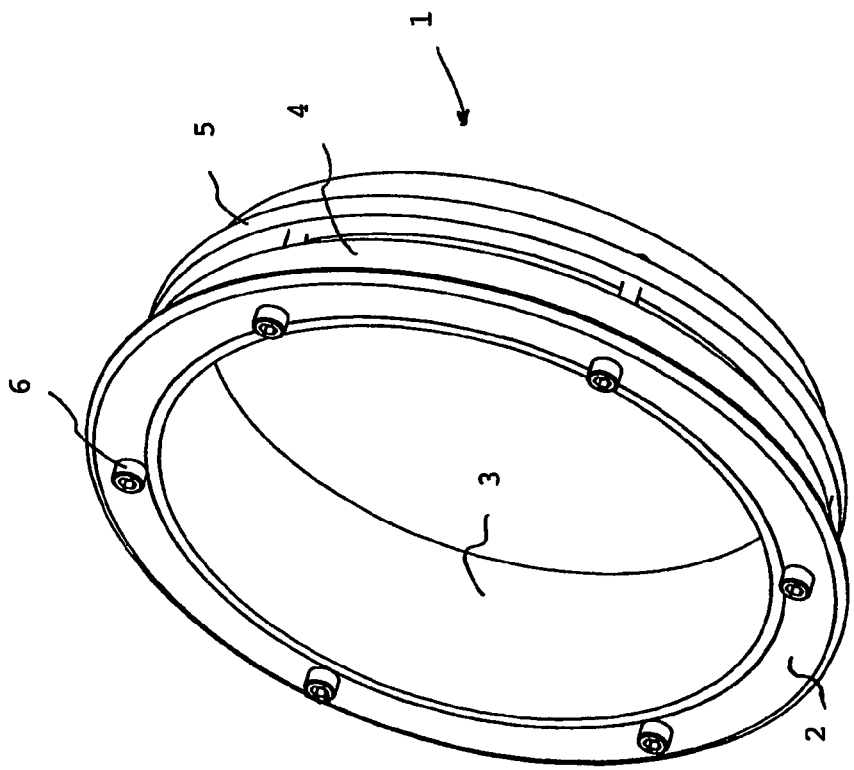

The sleeve 1 of the present invention has a flange 2 and a central part 3, which flange 2 extend outwardly from one end of the central part 3. Thus, the outer diameter of the flange 2 is larger than the outer diameter of the central part 3. On the central part 3 a part 4 of compressible material and a compression means, here in the form of a ring 5, are received. The compressible part 4 is placed between the flange 2 and the ring 5. The compressible part 4 is normally made of rubber, but in practice any compressible material may be used. The compression ring 5 is made of a material sufficient stiff to transfer the required compression force to the compressible part 4.

As used in this description the terms "axial", "radial" and corresponding expressions are in relation to a imaginary axis 8 going through the centre of the sleeve.

The sleeve 1 has an inner through opening, which has a circular cross section in the shown embodiment. The inner opening may have other forms in other embodiments, such as rectangular, square, oval, or any other polygonal form. The central part 3 of the sleeve 1 may also have other outer forms, such as oval, square, rectangular or any other polygonal form. A person skilled in the art realises that the forms of the compressible part 4 and the compression means are adapted to the form of the central part 3. Thus, if the central part 3 is not circular the compression means is not a ring.

The ring 5 is to function as a compression element, i.e. compress the compressible part 4. In order to function as a compression ring 5 a number of threaded openings are arranged to receive screws 6. Openings corresponding to the openings of the compression ring 5 are arranged in the flange 2 of the sleeve 1. The screws 6 are to be received in said openings of the flange 2. Thus, by means of the screws 6 the compression ring 5 may be moved towards the flange 2 of the sleeve 1. As the compressible part 4 is placed between the ring and the flange 2, it will be compressed if and when the ring 5 is moved towards the flange 2. Due to being compressed in the axial direction the compressible part 4 will expand in the radial direction.

Figure 3:
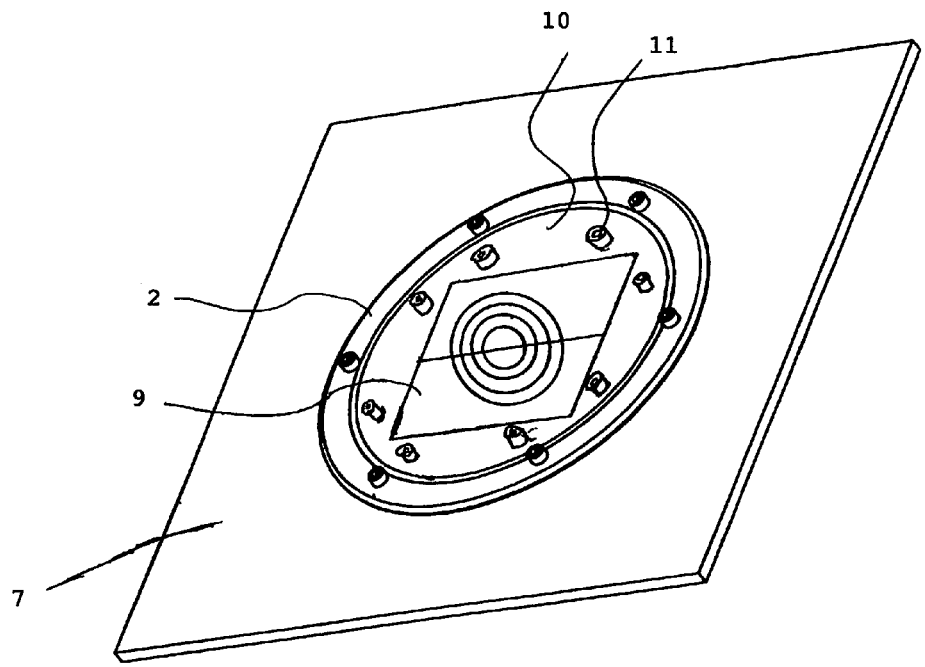
FIGS. 3 is a perspective view of the sleeve of FIGS. 1 and 2 mounted to a plate and with a seal for a cable entry or pipe penetration indicated.

Inside the central part 3 a seal 9 for one or more cable entries, pipe penetrations etc. are to be received. Often the seal 9 or seals for cable entries, pipe penetrations are received in a frame 10, as indicated in FIG. 3. In the shown embodiment a number of screws 11 are used to fix the frame 10. A person skilled in the art realises that the seal and frame may have any suitable form depending on intended use. However, as the seal and frame as such does not form any part of the present invention it will not be described further here.

The sleeve 1 is to be received in an opening in a plate 7 or the like. The plate 7 may be a part of any type of vessel, a cabinet, a technical shelter, junction box, machine etc. As the type of part receiving the sleeve 1 is of no direct importance it will not be described further here. Normally the axial extension of the compressible part 4 is larger than the thickness of the opening of the plate 7.

In use the sleeve 1, with the compressible part 4 and the compression ring 5 placed on the central part 3 of the sleeve 1, is placed in an opening of the plate 7 or the like. The outer diameter of the compression ring 5 and the compressible part 4, respectively, shall be smaller than the inner diameter of the opening of the plate 7. Thus, the central part 3, with the compressible part 4 and the compression ring 5, is put through the opening of the plate 7. The flange 2 of the sleeve 1 is pushed against the plate 7. The screws 6 are received in the openings of the flange 2 and compression ring 5, respectively.

Figure 4:
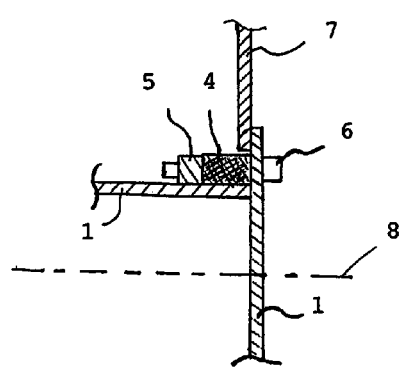
FIG. 4 is a principal sectional view of the sleeve of the previous Figs. in a not compressed state.

In the starting position the compressible part 4 has not yet been compressed. (See FIG. 4) The dimensions of the opening of the plate 7 and the sleeve 1 are adapted to each other. The central part 3 of the sleeve 1 together with the compressible part 4 and the compression means 5 are to be received in the opening of the plate 1. In the not compressed condition the compressible part 4 and the compression ring 5 have a small play to the opening of the plate 7. The outer diameter of the flange 2 should extend the diameter of the opening of the plate 7 to hinder the sleeve 1 from passing through the opening.

By the design of the sleeve 1 and the parts received on it, it is possible to mount the sleeve 1 from one side of the plate 7. That side is the side on which the flange 2 is to abut against the plate 7. Furthermore, thanks to the possibility to mount from one side it is relatively easy to retrofit sleeves 1 of this type.

Figure 5:
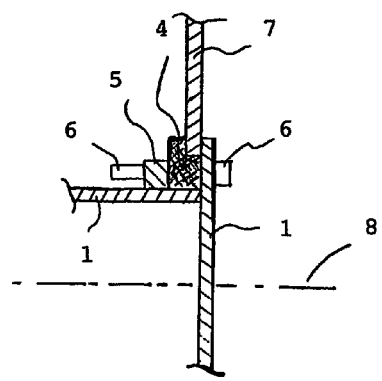
FIG. 5 is a view corresponding to FIG. 4 with the sleeve in a compressed state.

With the flange 2 of the sleeve 1 abutting against the plate 7, the screws 6 are turned to force the compression ring 5 in the direction towards the flange 2. As the compression ring 5 goes towards the flange 2 of the sleeve 1, the compressible part 4 is compressed in the axial direction. Due to the axial compression the compressible part 4 will expand in the radial direction. Thereby the compressible part 4 is pressed against the inner diameter of the opening of the plate 7. The compressible part 4 will also expand in radial direction outside the opening of the plate 7. (See FIG. 5) The effect that the compressible part 4 will expand in a radial direction outside the opening of the plate 7 is dependent on the axial extension of the compressible part 4 being larger than the thickness of the plate 7. Thus, the sleeve 1 will be held at the plate 7 by means of the flange 2, the compressible part 4 pressing on the inner diameter of the opening of the plate 7 and the compressible part 4 expanding at the side of the plate 7 opposite the flange 2.

The play between the compressible part 4 and the opening of the plate 7, as well as the properties of the compressible part 4 should be such that the sleeve 1 will be fixed in a sufficiently secure and sealed way by the movement of the compression ring 5. Thus, depending on the demands in each specific case compressible parts 4 having different properties and/or dimensions may be used.

By controlling the torque applied by each screw 6, it is possible to control the compression and, thus, the level of fixation and sealing of the sleeve 1. By increasing the number of screws 6 used it is possible to increase the maximal compression force of the compression ring 5. In view of this the compression ring 5 or other compression means must be strong enough to withstand the expected compression forces. Thus, by altering the material and/or thickness of the ring 5 it is possible to adapt the ring to different compression forces.

The invention claimed is:

1. A sleeve for cable entry, pipe penetrations, said sleeve comprising:
    a central part with a through central opening and a flange at one end of the central part, said flange is directed away from the central part;
    a compressible part being arranged, between and in contact with the flange and a compression means, arranged slidable on the outside of the central part, the outer diameter of the flange being larger than the inner diameter of an opening receiving the sleeve, and the sleeve is mounted in that the compressible part is compressed in axial direction by means of the compression means and thereby expand in radial direction to abut against the inner diameter of the opening receiving the sleeve, wherein the compression means is attached to the flange in a way enabling the compression means to obtain different positions in relation to the flange, and wherein the compression means is attached to the flang by means of screws, received in a thread engagement in openings of the compression means and the number of screws is adapted to the expected compression force.

2. The sleeve according to claim 1, wherein torque of the screws is controlled in order to control the compression force.

3. The sleeve according to claim 1, wherein the thickness and/or properties of the material of the compressible part and/or the compression means are adapted to the expected maximal compression force.

4. The sleeve according to claim 1, wherein the central part is received in an opening of a plate, whereby the flange abuts against one side of the plate.

5. The sleeve according to claim 4, wherein the inner configuration of the compression means correspond to the outer configuration of the central part of the sleeve.

6. The sleeve according to claim 5, wherein the compressible part, in a non-compressed condition, and the compression means are received with a play to the opening of the plate.

7. The sleeve according to claim 5, wherein the compressible part in a compressed condition will expand to a dimension larger than the inner diameter of the opening of the plate outside the plate.

8. The sleeve according to claim 5, wherein the compressible part is made of a rubber material and/or the axial extension of the compressible part is larger than the axial extension of the opening of the plate.

9. The sleeve according to claim 5, wherein the outer forms of the compression means and the central part of the sleeve (previously presented) The sleeve according to claim are such that they can be pushed through the central opening of the plate.

10. The sleeve according to claim 9, wherein the opening of the plate and/or the outer part of the central part of the sleeve has a circular cross section.

* * * * *